United States Patent [19]

Dietrich

[11] Patent Number: 4,565,429
[45] Date of Patent: Jan. 21, 1986

[54] NON-METALLIC EYEGLASS FRAME WITH ADJUSTABLE NOSE PAD ARMS

[75] Inventor: Anton Dietrich, Munich, Fed. Rep. of Germany

[73] Assignee: Optische Werke Rodenstock, Fed. Rep. of Germany

[21] Appl. No.: 446,504

[22] Filed: Dec. 3, 1982

[30] Foreign Application Priority Data

Dec. 11, 1981 [DE] Fed. Rep. of Germany ....... 3149178

[51] Int. Cl.$^4$ ............................................... G02C 5/12
[52] U.S. Cl. ..................................... 351/137; 351/88; 351/138
[58] Field of Search .................... 351/137, 132, 78, 80, 351/118, 131, 138, 88

[56] References Cited

U.S. PATENT DOCUMENTS

| | | | |
|---|---|---|---|
| 2,486,881 | 11/1949 | Roth | 351/137 X |
| 2,887,929 | 5/1959 | Farmer | 351/118 X |

FOREIGN PATENT DOCUMENTS

| | | | |
|---|---|---|---|
| 358570 | 4/1938 | Italy | 351/131 |
| 869874 | 6/1971 | United Kingdom | 351/137 |

Primary Examiner—Rodney B. Bovernick
Attorney, Agent, or Firm—Craig and Burns

[57] ABSTRACT

A non-metallic eyeglass frame with nose pads arranged at adjustable nose pad supporting arms; during the manufacture of the frame center part, for example, by injection molding, a center piece preferably consisting of metal and connecting the two nose pad arms is formed-in within the nose bridge area of the frame; one mounting each for the nose pad arms may be provided in the end areas of the center piece.

13 Claims, 10 Drawing Figures

NON-METALLIC EYEGLASS FRAME WITH ADJUSTABLE NOSE PAD ARMS

The present invention relates to a non-metallic eyeglass frame with nose pads arranged at adjustable side bar arms.

A plastic eyeglass frame is known from the German Patent 701,971, in which an individual adaptation to the shape of the nose of the eyeglass wearer is possible by adjustable bars. The side bar arms are thereby arranged in or at small non-metallic blocks or reinforcements of the frame center part.

The German Patent 701,982 (an addition to the aforementioned German patent) describes an arrangement in which the adjustable arms are arranged in a common, non-metallic bearer that is secured, for example, bonded or adhesively secured to the frame.

Support arms rigidly connected with each other on plastic frames are also known, for example, from the U.S. Pat. No. 2,685,819, whereby the support arms are retained by a snap-in connection. The French Pat. No. 2,151,656 discloses that the center piece connecting the support arms is inserted into a recess of the nose bridge area and is threadably secured.

The aforementioned state of the art involves eyeglass frames whose center part is machined from plastic plates by turning or cutting whereby the nose pad supporting arms, respectively, the center piece connecting the nosepad supporting arms are secured in or at the frame in a subsequent operation.

The present invention is concerned with the task to so construct a plastic eyeglass frame with adjustable nose pad supporting arms that already during the manufacture of the frame center part by plastic molding, for example, by injection molding, a stable mounting for the nose pad arms is securely embedded therein.

The underlying problems are solved according to the present invention in that within the nose bridge area of the frame, a center piece is formed-in which connects the two nose pad arms and preferably consists of metal.

According to a further feature of the present invention, the center piece may be provided at its end areas with a mounting each for the nose pad arms.

It is the aim of this construction to avoid during the surface treatment methods following the injection molding, especially during the so-called deburring (tumbling in a barrel), projecting parts at the frame center part which thereby act in an interfering manner, and to subsequently detachably retain the nose pad connecting arms in the mountings secure against rotation.

The end areas serving as mountings for the nose pad connecting arms may have a U-shaped cross section, whereby the cross section of the nose pad connecting arms is matched within the connecting area to the mountings of the center piece.

However, cross sections other than U-shaped cross sections are also possible for the nose pad connecting arm mountings insofar as they have a shape suitable for the guidance and for securing against rotation.

The connecting area of the nose pad connecting arms can also be constructed as a rectangle or square toothed or serrated either along one side or along several sides, whose toothed arrangement or serration comes into engagement at the open side of the U-shaped profile with the adjoining plastic material of the frame.

With eyeglass frames of translucent material, the formed-in center piece may produce a decorative effect with a corresponding coloring and configuration.

These and further objects, features and advantages of the present invention will become more apparent from the following description when taken in connection with the accompanying drawing which shows, for purposes of illustration only, several embodiments in accordance with the pesent invention, and wherein.

FIGS. 5 and 6, 7 and 8, and 9 and 10 are respectively elevational and plan views of different embodiments of center pieces in accordance with the present invention.

Figure 1:
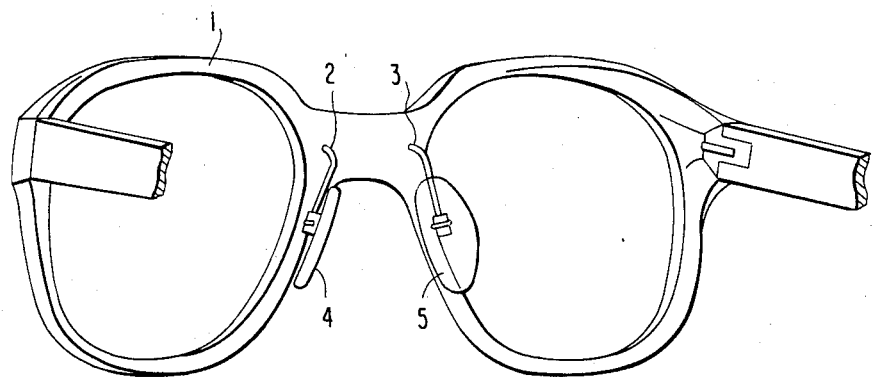
FIG. 1 is a perspective view of a plastic eyeglass frame in accordance with the present invention.

Referring now to the drawing wherein like reference numerals are used throughout the various views to designate like parts, and more particularly to FIG. 1, this figure illustrates a plastic eyeglass frame having a frame center part 1 with the nose pad arms 2 and 3 and the nose pads 4 and 5.

Figure 2:
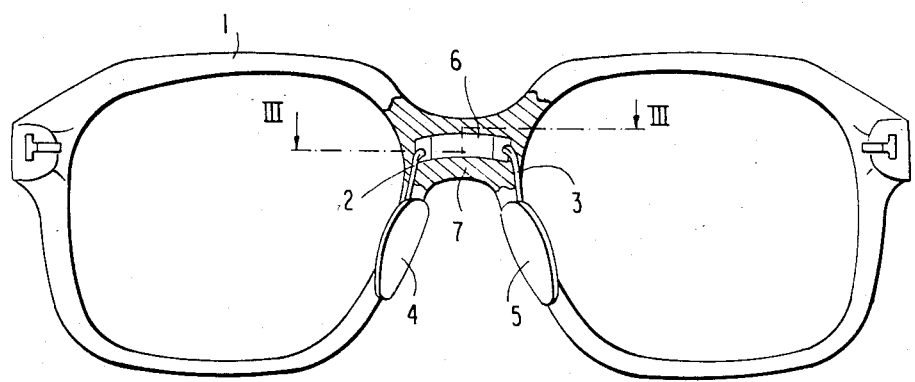
FIG. 2 is a rear view of a frame center part in accordance with the present invention, partly in cross section.

FIG. 2 illustrates the frame center part 1 in rear view, whereby it can be seen that the center piece 6 connecting the two nose pad arms 2 and 3 is formed-in into the nose bridge area 7.

Figure 3:
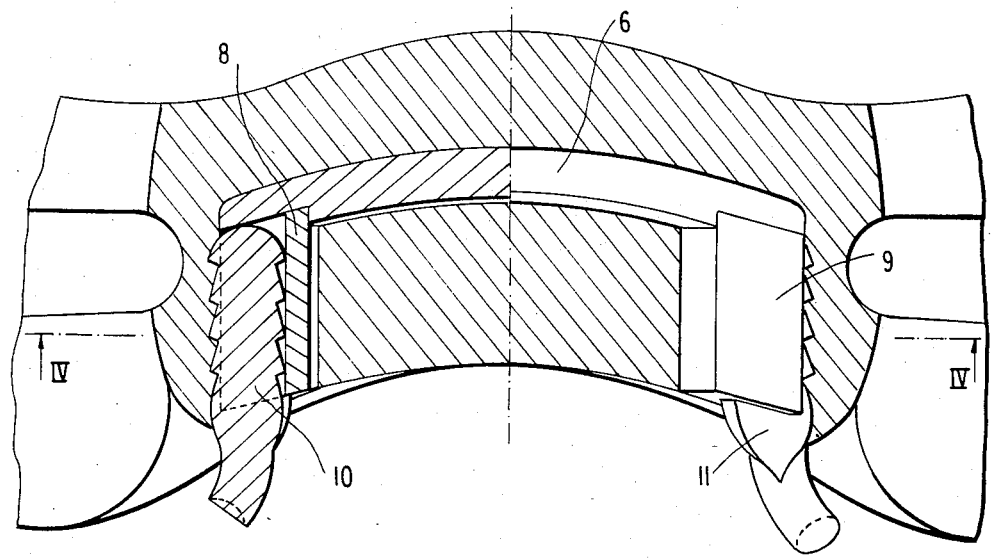
FIG. 3 is a plan view of the center piece of the eyeglass frame of FIG. 2, on an enlarged scale and with a cross section taken along line III—III of FIG. 2.

FIG. 3 represents a plan view, on an enlarged scale, with the cross section taken in the plane III—III of FIG. 2, and illustrates the center piece 6 together with the nose pad arm mountings 8 and 9 and the nose pad arm connecting areas 10 and 11 constructed as toothed or serrated rectangle.

Figure 4:
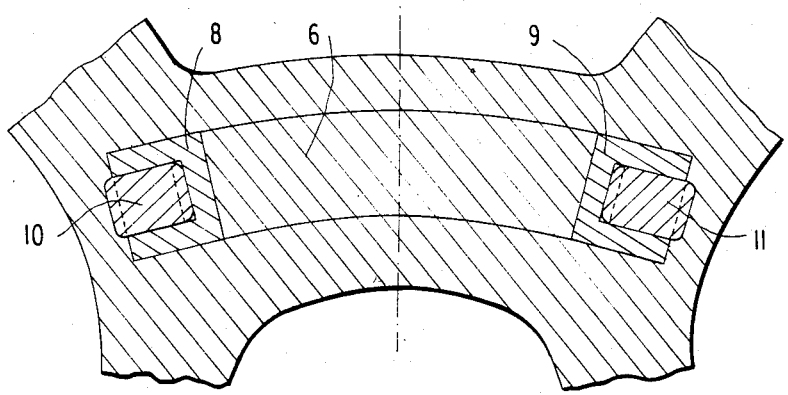
FIG. 4 is a rear view of the center piece of the eyeglass frame of FIG. 3, with the cross section taken along line IV—IV of FIG. 3.

FIG. 4 represents a rear view, with the cross section taken in the plane IV—IV of FIG. 3. The reference numerals used in FIG. 4 correspond to those of FIG. 3.

Figure 5:

FIG. 5 illustrates an assembled center piece consisting of the connecting piece 12 and of two nose pad arm mountings 13 and 14 secured thereto, for example, by soldering.

Figure 6:
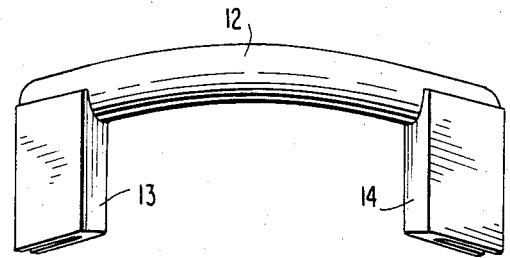

FIG. 6 represents the plan view of the center piece illustrated in FIG. 5 with the corresponding reference numerals.

Figure 7:
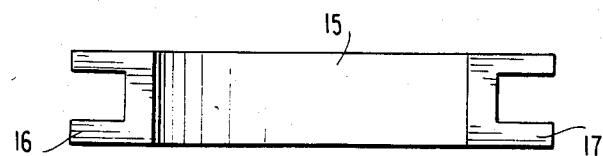

FIG. 7 illustrates a unitary center piece having the connecting area 15 and the nose pad arm mountings 16 and 17 made in one piece therewith.

Figure 8:
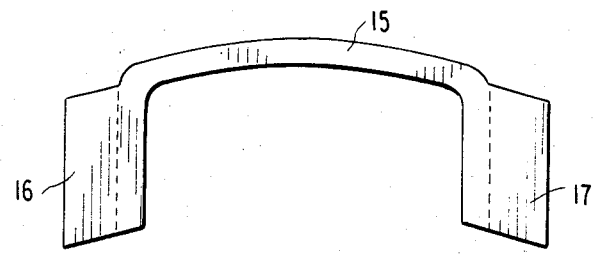

FIG. 8 represents the plan view of FIG. 7 with the corresponding reference numerals.

Figure 9:
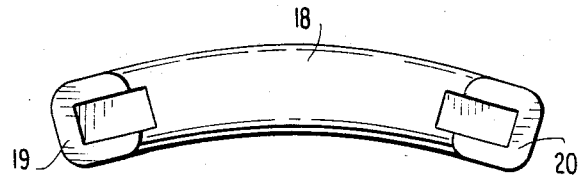

FIG. 9 illustrates a center piece made by the extrusion method having the connecting area 18 and the nose pad arm mountings 19 and 20.

Figure 10:
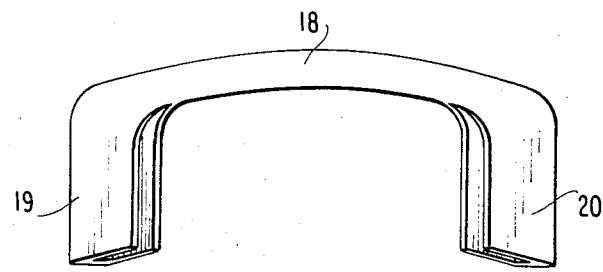

FIG. 10 represents the plan view of FIG. 9 with the corresponding reference numerals.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A non-metallic eyeglass frame having a nose bridge area and nose pads arranged on adjustable nose pad arms, a center piece substantially completely embedded within the nose bridge area of the frame in such a manner that the center piece is substantially devoid of any part projecting beyond the surface of the frame, and means for enabling secure anchoring of the nose pad arms in said center piece subsequent to the embedding of the center piece in the frame to allow adjustment of the nose pad arms without disengagement of the nose pad arms from the frame.

2. An eyeglass frame according to claim 1, wherein the center piece consists of metal.

3. An eyeglass frame according to claim 1, wherein the center piece is provided at its end areas with one mounting means each for the nose pad arms.

4. An eyeglass frame according to claim 3, wherein the end areas serving as mounting means have a substantially U-shaped cross section.

5. An eyeglass frame according to claim 4, wherein the center piece consists of metal.

6. An eyeglass frame according to claim 4, wherein the U-shaped profile is disposed opposite the eyeglass frame center with its open side.

7. An eyeglass frame according to claim 4, wherein the U-shaped profile faces with its open side the frame center.

8. An eyeglass frame according to claim 3, wherein the cross section of the nose pad arms is coordinated within the connecting area thereof to the mounting means of the center piece.

9. An eyeglass frame according to claim 8, wherein the connecting area of the nose pad arms is constructed as toothed rectangle whose toothed arrangement cooperates along the open side of the U-profile of the mounting means with the adjoining plastic material of the eyeglass frame.

10. An eyeglass frame according to claim 9, wherein the rectangle is toothed along one side.

11. An eyeglass frame according to claim 9, wherein the rectangle is toothed along several sides.

12. An eyeglass frame according to claim 9, wherein the center piece consists of metal.

13. A non-metallic eyeglass frame having a nose bridge area and nose pads arranged on adjustable nose pad arms, a center piece substantially completely embedded within the nose bridge area of the frame in such a manner that the center piece is substantially devoid of any part projecting beyond the surface of the frame, and means for detachably securely anchoring of the nose pad arms in said center piece.

* * * * *